(12) United States Patent
Malla et al.

(10) Patent No.: US 8,382,016 B2
(45) Date of Patent: Feb. 26, 2013

(54) NANO PARTICLE MINERAL PIGMENT

(75) Inventors: Prakash B. Malla, Dublin, GA (US); Siva Devisetti, Sandersville, GA (US)

(73) Assignee: Thiele Kaolin Company, Sandersville, GA (US)

( * ) Notice: Subject to any disclaimer, the term of this patent is extended or adjusted under 35 U.S.C. 154(b) by 984 days.

(21) Appl. No.: 12/380,208

(22) Filed: Feb. 25, 2009

(65) Prior Publication Data

US 2010/0215972 A1   Aug. 26, 2010

(51) Int. Cl.
*B02C 19/00* (2006.01)

(52) U.S. Cl. ............................................. 241/21; 241/29

(58) Field of Classification Search .................... 241/21, 241/29, 3
See application file for complete search history.

(56) References Cited

U.S. PATENT DOCUMENTS

| | | | |
|---|---|---|---|
| 3,586,523 A | 6/1971 | Fanselow et al. | |
| 4,165,840 A * | 8/1979 | Lewis et al. | 241/20 |
| 4,835,195 A | 5/1989 | Rayfield et al. | |
| 4,851,048 A | 7/1989 | Jones et al. | |
| 4,898,620 A | 2/1990 | Rayfield et al. | |
| 5,030,286 A | 7/1991 | Crawford et al. | |
| 5,261,956 A | 11/1993 | Dunaway et al. | |
| 5,643,631 A | 7/1997 | Donigian et al. | |
| 5,827,363 A | 10/1998 | Darsillo et al. | |
| 5,856,397 A | 1/1999 | Pope et al. | |
| 5,997,625 A | 12/1999 | Londo et al. | |
| 6,150,289 A | 11/2000 | Chen et al. | |
| 6,478,865 B1 | 11/2002 | Malla et al. | |
| 6,585,822 B2 | 7/2003 | Berube et al. | |
| 6,610,136 B2 | 8/2003 | Malla et al. | |
| 2003/0019399 A1 | 1/2003 | Malla et al. | |
| 2004/0241442 A1 | 12/2004 | He et al. | |

FOREIGN PATENT DOCUMENTS

| | | |
|---|---|---|
| EP | 0359385 A1 | 3/1990 |
| EP | 1160294 A2 | 5/2001 |
| KR | 10-0484403 | 4/2005 |
| WO | WO 98/36029 | 8/1998 |

* cited by examiner

*Primary Examiner* — Mark Rosenbaum
(74) *Attorney, Agent, or Firm* — Baker, Donelson, Bearman, Caldwell & Berkowitz, PC

(57) ABSTRACT

Mineral pigments (such as kaolin clay) having a high surface area and particle size in the nano scale range are provided which are useful in paper coating and filling, ink jet coating formulations, paint compositions, and as a filler in rubbers, plastics and polymers. These pigments are manufactured by intensive wet milling of a mineral composition which may have undergone prior dry grinding and then optionally subjecting the wet milled mineral composition to an acid treatment.

5 Claims, No Drawings

NANO PARTICLE MINERAL PIGMENT

TECHNICAL FIELD

This invention relates to mineral pigments. In a more specific aspect, this invention relates to mineral pigments having a high surface area and a majority of particles with a particle size of less than 200 nanometers. This invention also relates to a process for the manufacture of these mineral pigments.

This invention will be described in detail with specific reference to kaolin clay as the starting mineral composition. However, this invention will be understood as applicable to other starting mineral compositions, such as natural calcium carbonate, precipitated calcium carbonate, bentonite, talc, calcium sulfate (also referred to as gypsum), zeolite, titanium dioxide, iron oxide, iron hydroxide, aluminum oxide and aluminum hydroxide.

BACKGROUND OF THE INVENTION

Kaolin is a naturally occurring, relatively fine, white clay mineral which may be generally described as a hydrated aluminum silicate ($Al_2O_3.2SiO_2.2H_2O$). The structure of kaolin is principally one octahedral $Al(OH)_3$ sheet covalently bonded with one tetrahedral $SiO_4$ sheet to form a 1:1 layer. Ideally, this 1:1 layer is electrically neutral. Adjacent layers are held together primarily by hydrogen bonding between the basal oxygen atoms of the tetrahedral sheet and the hydroxyls of the surface plane of the adjacent octahedral sheet.

The ideal structural formula of kaolin can be represented as $Al_2Si_2O_5(OH)_4$. After purification and beneficiation, kaolin is widely used as a filler and pigment in various materials, such as rubber and resins, and in various coatings, such as paints and coatings for paper.

The use of kaolin in paper coatings serves, for example, to improve brightness, color, gloss, smoothness, opacity, printability and uniformity of appearance of the coated paper. As a filler in paper formulations, kaolin is used to extend fiber and reduce cost, and to improve opacity, brightness and other desirable characteristics of the filled paper product.

Kaolin clay is naturally hydrous and may contain as much as 13.95% water in the structure in the form of hydroxyl groups. Examples of hydrous kaolin clay are the products marketed by Thiele Kaolin Company (Sandersville, Ga.) under the trademarks Kaofine 90 and Kaolux. These products have not been subjected to a calcination step.

Calcined kaolin is another type of kaolin and is obtained by heating (i.e., calcining) beneficiated kaolin clay at temperatures of at least 550° C. The calcination step dehydroxylates and converts the kaolin into a noncrystalline aluminosilicate phase. (The term "dehydroxylates" refers to the removal of structural hydroxyl groups from the kaolin in the form of water vapor.) The smaller particles of the feed clay are aggregated by calcination, and this aggregation increases the original volume of the kaolin and gives the calcined kaolin a "fluffy" appearance. Particle aggregation increases the light scattering characteristics of the kaolin (as compared to non-calcined kaolin) and, therefore, contributes to a high degree of opacity and insulating properties to a coated paper.

In addition, calcination increases the brightness of kaolin. An example of calcined kaolin clay is the product marketed by Thiele Kaolin Company under the trademark KAOCAL. The high brightness of the calcined clay is partly due to the removal of organic material and partly due to the mobilization of the impurity phases in the amorphous network at elevated temperatures. The brightness can also be improved through pre-calcination beneficiation processes such as magnetic separation, froth flotation, selective flocculation and chemical leaching.

Both hydrous and calcined kaolin clay products are useful in coating compositions for conventional printing applications such as offset, rotogravure, letterpress and flexographic. However, without substantial mechanical and/or chemical modifications, conventional hydrous and calcined kaolin clay products are not useful in coating compositions for ink jet printing applications.

In an ink jet printing process, uniformly shaped tiny droplets of aqueous or solvent based dye solutions are ejected from a nozzle onto a substrate. There are two primary types of ink jet printing—continuous ink jet printing and drop on demand ink jet printing (DOD). The continuous ink jet is used in high speed printing such as addressing, personalization, coding and high resolution color printing such as proofing. The DOD ink jet is mainly used in home, office and wide format printing.

Common DOD ink jet printers are the thermal ink jet printer and the piezoelectric printer. In the thermal (or bubble jet) process, ink is heated and vaporized periodically with a heating element connected to the digital data to generate bubbles. Since the volume of the ink increases during vaporization, the ink is forced out of the nozzle in the form of a drop which is deposited on the paper.

In the piezoelectric process, the drop is generated by pressure using a piezoelectric crystal instead of heat as in the thermal method. The piezoelectric materials exhibit the "piezo-electric effect"; that is, the materials undergo distortion when an electric field is applied. The piezoelectric crystal mounted behind the nozzle expands and shrinks when an electrical pulse is applied, followed by displacement of drops from the nozzle. The piezoelectric printer has several advantages (e.g., a more controlled and higher rate of drop production and long head life) over the thermal printer.

Ink jet printing requires special paper for achieving high quality images due to the nature of the inks used and the design of the printhead. Most of these inks are anionic and principally consist of water and a water soluble solvent. Inks are jetted from a series of very small orifices, each approximately 10-70 μm in diameter, to specified positions on a media to create an image. Multipurpose plain paper is unsuitable for good quality ink jet printing since that type of paper causes numerous quality issues such as feathering, wicking, color bleeding, low color density, strike-through and cockle/curl. Consequently, ink jet papers are commonly coated with special ink receptive layers which are formulated to provide good print quality and adequate ink drying/absorption.

Amorphous silica (such as silica gel) is a commonly used pigment for the matte grade ink jet coating applications. The high surface area and porous silica pigment provides high porosity coatings for quick absorption of ink solvent and rapid ink drying time. However, silica gel is expensive and can only be made down at very low solids. For example, most silica gels can be made down at only 15-18% solids which may result in low coating solids.

Several non-silica based pigments for ink jet paper coating applications are known in the industry. For example, heat aged-precipitated calcium carbonate is disclosed in Donigan et al. U.S. Pat. No. 5,643,631.

Chen et al. PCT International Publication No. WO 98/36029 and Chen et al. U.S. Pat. No. 6,150,289 disclose a coating composition comprising calcined clay, a cationic polymer, polyvinyl alcohol, a latex binder and optionally a cross-linking agent.

Londo et al. U.S. Pat. No. 5,997,625 discloses a coating composition comprising a fine particle hydrous clay, a caustic leached calcined clay and a porous mineral (zeolite).

Malla and Devisetti U.S. Pat. No. 6,610,136 discloses aggregated mineral pigments having a high surface area and low light scattering and useful in coating and filling compositions for ink jet printing media.

All of the above non-silica based pigments are primarily designed for matte grade ink jet coated paper. However, in most of the photographic and high end ink jet printing applications, a glossy coated paper is preferred. Currently, there are two types of glossy coatings: (1) a swellable polymer coating and (2) a microporous coating.

In a swellable polymer coating, the drying of ink is slow and involves diffusion of water molecules into the polymer matrix and swelling of the polymer matrix. Polymers such as polysaccharides (cellulose derivatives), gelatins, poly(vinyl alcohol), poly(vinyl pyrrolidone) and poly(ethylene oxide) are used in swellable coatings. On the other hand, ink drying is relatively fast in a microporous coating which occurs due to water absorption into the pore structures of the coating and base paper by capillary action. High surface area and very fine particle pigments such as alumina, aluminum hydroxides, fumed silica, and colloidal silica are the pigments of choice for glossy coatings.

Berube et al. U.S. Pat. No. 6,585,822 discloses the use of fine particle kaolin clay as a gloss coating on a paper pre-coated with a layer of a microporous ink jet coating pigment comprising a mixture of hydrous kaolin clay, caustic leached calcined kaolin clay and a zeolitic molecular sieve. The glossy pigment coating requires that the paper be pre-coated with a highly absorbent coating layer.

The above mentioned pigments can be very expensive, difficult to handle or do not meet the performance requirements. Thus, there is a need in the industry for a cost effective mineral pigment that meets the performance requirements for glossy ink jet printing applications.

DETAILED DESCRIPTION OF THE INVENTION

The present invention provides a mineral pigment having a high surface area and a majority of particles with a particle size of less than 200 nanometers.

The present invention also provides a process for the manufacture of these mineral pigments, wherein the process comprises the sequential steps of obtaining a beneficiated unmilled mineral composition and wet milling the mineral composition under conditions of high intensity to produce a mineral pigment, whereby the particles of the mineral pigment have an increased surface area and a decreased particle size, as compared to the starting material.

In this application, the following terms shall have the indicated definitions:
  "nano particle"—a particle having a particle size of less than 200 nanometers.
  "conditions of high intensity"—wet milling under conditions which produce particles which are substantially increased in surface area and substantially decreased in particle size as compared to the unmilled starting material; also referred to as "intensive" wet milling.

The process of this invention can be modified to include a step in which the beneficiated unmilled mineral composition is subjected, prior to wet milling, to dry grinding under conditions of high intensity. The dry grinding step serves to aggregate the particles during grinding to yield a mineral pigment that provides improved ink jet printability and is increased in surface area but decreased in light scattering coefficient (when compared to those characteristics of the starting beneficiated unground mineral composition). In this embodiment, the wet milling step serves to separate the aggregated particles to produce a majority of particles having a particle size of less than 200 nanometers.

The process of this invention can be further modified to include a step in which the dry ground and wet milled particles are subjected to an acid treatment. In this embodiment, the acid treatment serves to increase the surface area of the wet milled particles over that of the wet milled particles prior to the acid treatment. The process of this invention can be further modified to include acid treatment after dry grinding but before wet milling. If used in the process of this invention, the acid treatment step (which can be either before or after wet milling) is done after dry grinding. Examples of acids which can be used in the acid treatment are sulfuric, hydrochloric and nitric acids.

Many of the current ink jet inks are anionic in nature and require a cationic coating surface to fix or immobilize the anionic ink jet ink dyes on the surfaces. However, the conventional paper coatings are anionic in nature and require that the pigments be dispersed using an anionic dispersant. Examples of suitable anionic dispersants are polyacrylates, silicates and phosphates. When an anionically dispersed wet milled nanoparticle kaolin slurry of this invention is used in ink jet coating, the addition of a cationic dye fixative to the anionic coating "shocks" the coating with thickening and grit formation.

This invention also relates to the production of a cationic mineral pigment slurry. In order to produce a cationic wet milled nano particle kaolin slurry, the starting kaolin, either unmilled or dry ground, is dispersed with cationic polymer prior to wet milling. Examples of suitable cationic dispersants are polyamines and polydialkyldiallyl-ammonium halides, such as dimethyldiallylammonium chloride.

The wet milling process of this invention should be carefully controlled to achieve the desired particle size or surface area and slurry solids. The slurry tends to thicken with wet milling due to reduction in particle size and a concomitant increase in surface area. The thickening can be minimized by adding an appropriate amount of dispersant and diluent depending upon the time of wet milling. A longer wet milling time would require more dispersant as well as diluent. Alternatively, an excess of predetermined amount of dispersant can be added before wet milling and, in this case, additional dispersant may not be required during wet milling. The slurry consistency can then be adjusted through a controlled dilution to achieve maximum wet milling.

The conventional fine particle kaolin pigment coatings provide high paper gloss, but these coatings do not provide high color density and sufficient porosity for rapid ink absorption, which can lead to puddling, ink smearing and overall poor print quality. However, we have discovered that either hydrous or calcined kaolin clay, after controlled reduction of particle size, gives high gloss and improves ink drying, image formation (also referred to as image acuity) and color density over the original starting hydrous or calcined kaolin clay.

Normally, a paper coating composition contains one or more pigments, binders (adhesives), and additives. The type and amount of these components are known to affect the optical, mechanical and fluid absorption characteristics of the composition. A binder is an integral part of a coating to keep the coating adhered to the coated substrate (such as paper) and to prevent dusting during paper handling and the printing process. Examples of suitable binders include natural materials (such as starches and proteins) and synthetic materials (such as latexes).

The mineral pigments of this invention require no binder when used as a sole pigment and need a very low amount of binder when used in conjunction with other high surface area pigments. The ability of the pigment of this invention to self adhere to the substrate makes our pigment unique in providing interesting properties in addition to minimizing the cost of the coating. The self adhesive property of the product of this invention is believed to have come from its particle size in the nano scale range.

The present invention is further illustrated by the following examples which are illustrative of certain embodiments designed to teach those of ordinary skill in the art how to practice this invention and to represent the best mode contemplated for practicing this invention.

EXAMPLE 1

A high brightness fine No. 1 clay marketed under the trademark Kaofine 90 by Thiele Kaolin Company is used as the starting material. An anionic slurry of this clay is prepared at 70% solids using sodium polyacrylate as dispersant. The slurry is diluted to nearly 50% solids prior to wet milling. The anionic slurry of Kaofine 90 kaolin clay is wet milled in a circulation type process at various process times using a laboratory high intensity wet milling attritor (Model QC100, Union Process Inc., Akron, Ohio). The wet milling process using the QC100 attritor includes loading the milling chamber with media and circulating clay slurry for a certain time (process time). The longer the circulation of clay slurry, the longer is the process time. The milling chamber equipped with a discharge screen of 0.15 mm (100% open) is loaded with 260 ml of 0.4 mm size yttrium stabilized zirconia (YTZ) media. At a given media loading, either increase in process time or reduction in the amount of clay loading would increase the wet milling intensity. The anionic slurry of Kaofine 90 kaolin clay equivalent to 5 pounds dry material is wet milled at either 60 minutes or 120 minutes of process time. The product characteristics before and after wet milling are provided in Table A.

As the wet milling continues, the clay particles are broken down into ultrafine particles and the slurry becomes thick. After a certain length of time, further wet milling is difficult. Additional dispersant is added as needed to facilitate the flow of slurry. Water is used as a second option to facilitate slurry flow. The BET surface area and Sedigraph particle size distribution data provided in Table A indicate that the particle size decreases and the surface area increases with the wet milling process compared to the starting feed material. The surface area increases further with an increase in process time due to a further decrease in particle size.

EXAMPLE 2

A high brightness hydrous kaolin product marketed under the trademark Kaolux by Thiele Kaolin Company is used as the starting material. An anionic slurry of Kaolux kaolin clay is prepared at 65% solids using sodium polyacrylate as dispersant. The slurry is diluted to nearly 50% solids prior to wet milling. By following the procedure of Example 1, the anionic slurry equivalent to 5 pounds dry material is wet milled at either 60 or 120 minutes of process time. The product characteristics for unground and wet milled products of Kaolux kaolin clay feed are provided in Table A.

The data in Table A indicate that increases in surface area and decreases in particle size are due to wet milling. The surface area increases further with an increase in process time due to further decrease of particle size. At the same process time and clay loading, the wet milled products resulted from a Kaofine 90 kaolin clay feed described in Example 1 are much finer than the wet milled products of a Kaolux kaolin clay feed.

TABLE A

|  | KAOFINE 90 | | | KAOLUX | | |
|---|---|---|---|---|---|---|
|  | Original | Wet Milled | | Original | Wet Milled | |
|  | Unground | Product 1 | Product 2 | Unground | Product 3 | Product 4 |
| Wet milling conditions | | | | | | |
| Process time, min | — | 60 | 120 | — | 60 | 120 |
| [1]Clay loading, pounds | — | 5.0 | 5.0 | — | 5.0 | 5.0 |
| [2]Dispersant, % | — | 1.9 | 2.4 | — | 1.9 | 1.9 |
| Product Characteristics | | | | | | |
| Product solids, % | 70.0 | 50.5 | 51.0 | 65.0 | 49.5 | 50.0 |
| Product slurry pH | 7.0 | 7.0 | 7.2 | 7.0 | 7.0 | 7.2 |
| Brookfield viscosity, cP @20 rpm | 280 | 250 | 1500 | 250 | 870 | 1130 |
| BET surface area, $m^2/g$ | 21.2 | 32.4 | 44.1 | 13.5 | 30.7 | 42.3 |
| Particle size distribution, Sedigraph | | | | | | |
| %<5.0 μm | 99.0 | 99.4 | 99.4 | 96.4 | 99.4 | 99.2 |
| %<2.0 μm | 98.4 | 98.5 | 98.1 | 77.2 | 97.3 | 97.6 |
| %<1.0 μm | 97.7 | 98.3 | 98.4 | 57.1 | 87.4 | 91.3 |
| %<0.5 μm | 91.8 | 94.7 | 97.2 | 33.1 | 61.7 | 73.8 |
| %<0.25 μm | 62.3 | 72.7 | 80.7 | — | 40.3 | 57.1 |
| %<0.2 μm | 51.6 | 63.9 | 72.7 | 15.0 | 36.9 | 53.0 |

[1,2]Dry basis,
[2]Sodium polyacrylate

EXAMPLE 3

A high surface area aggregated kaolin product marketed under the trademark Kaojet is used as the starting material. An anionic slurry of Kaojet kaolin clay is prepared at 59.5% solids using sodium polyacrylate as dispersant. The slurry is diluted to nearly 50% solids prior to wet milling. By following the procedure of Example 1, the anionic slurry of Kaojet kaolin clay equivalent to 5 pounds dry material is wet milled at either 60, 120 or 180 minutes of process time. The product characteristics for original and wet milled Kaojet kaolin clays are provided in Table B.

The data in Table B indicate that increases in surface area and decreases in particle size are due to wet milling compared to the starting original material. The surface area increases further with an increase in process time due to further decrease of particle size. At the same process time and clay loading, a Kaojet kaolin clay feed results in much finer particle size and much higher surface area than the products resulted from the wet milling of Kaofine 90 kaolin clay feed described earlier in Example 1, indicating that the wet milling process is more effective for the Kaojet kaolin clay feed.

EXAMPLE 4

A high surface area aggregated kaolin product produced by dry grinding the Kaolux kaolin clay product is used as the starting material. An anionic slurry of dry ground Kaolux kaolin clay product is prepared at 59% solids using sodium polyacrylate as dispersant. The slurry is diluted to nearly 50% solids prior to wet milling. By following the procedure of Example 1, the anionic slurry of original (dry ground) Kaolux kaolin clay equivalent to 5 pounds dry material is wet milled at either 60 or 120 minutes of process time. The product characteristics for original (dry ground) and wet milled materials for dry ground Kaolux kaolin clay feed are provided in Table B.

The data in Table B indicate that the increases in surface area and decreases in particle size are due to wet milling compared to the starting original material. The surface area increases further with increase in process time due to further decrease of particle size. Under similar wet milling conditions, dry ground Kaolux kaolin clay feed results in much finer particle size than the standard Kaolux kaolin clay feed (described in Example 2), indicating that the wet milling process is more effective if the feed is dry ground prior to wet milling.

TABLE B

| | KAOJET | | | | Dry Ground KAOLUX | | |
| | | Wet Milled | | | | Wet Milled | |
| | Original | Product 5 | Product 6 | Product 7 | Original | Product 8 | Product 9 |
|---|---|---|---|---|---|---|---|
| Wet milling conditions | | | | | | | |
| Process time, min | — | 60 | 120 | 180 | — | 60 | 120 |
| [1]Clay loading, pounds | — | 5.0 | 5.0 | 5.0 | — | 5.0 | 5.0 |
| [2]Dispersant, % | 0.5 | 1.7 | 2.2 | 3.4 | 0.5 | 3.4 | 5.7 |
| Product Characteristics | | | | | | | |
| Product solids, % | 59.5 | 50.5 | 51.5 | 42 | 59.0 | 50.8 | 51.0 |
| Product slurry pH | 7.0 | 7.0 | 7.2 | 7.2 | 7.0 | 7.2 | 7.2 |
| Brookfield viscosity, cP @20 rpm | 45 | 1825 | 9100 | — | 60 | 1500 | 5600 |
| BET surface area, $m^2/g$ | 44.5 | 72.9 | 86.4 | 94.5 | 32.5 | 69.5 | 84.0 |
| Particle size | | | | | | | |
| %<5.0 μm | 74.9 | 99.7 | 98.7 | 98.8 | 73.5 | 100.2 | 99.0 |
| %<2.0 μm | 50.8 | 98.5 | 98.2 | 100 | 43.8 | 98.9 | 98.4 |
| %<1.0 μm | 40.6 | 98.5 | 98.3 | 99.0 | 27.1 | 98.4 | 98.1 |
| %<0.5 μm | 32.1 | 97.5 | 97.8 | 98.0 | 13.0 | 93.3 | 95.3 |
| %<0.25 μm | 19.7 | 84.9 | 91.8 | 91.9 | — | 72.1 | 80.3 |
| %<0.2 μm | 17.2 | 76.8 | 88.7 | 90.4 | 6.6 | 64.8 | 74.2 |

[1,2]Dry basis,
[2]Sodium polyacrylate

EXAMPLE 5

This Example 5 describes the wet milling of a cationically dispersed clay material.

A cationic slurry of Kaojet kaolin clay is used as the starting material. A cationic slurry is prepared at 59% solids using a low molecular weight high charge density poly-diallyldimethylammonium chloride cationic polymer (poly-DADMAC) as a dispersant. The poly-DADMAC marketed under the trademark Nalkat 2020 by Nalco Chemical Company is used. The slurry is diluted to nearly 50% solids prior to wet milling. The cationically dispersed Kaojet kaolin clay is wet milled by following the procedure of Example 1, except that a cationic polymer is used during the wet milling process to maintain the flow properties. The cationic slurry of Kaojet kaolin clay equivalent to 5 pounds dry material is wet milled at 75 minutes of process time. The slurry equivalent to 2.5 pounds dry material is also wet milled at 75 minutes of process time. As the wet milling continues, the clay particles are broken down into ultrafine particles, and the slurry becomes thick. After a certain length of time, further wet milling is difficult. Additional cationic polymer is added as necessary as dispersant to facilitate slurry flow. Water is used as a second option to facilitate slurry flow.

The wet milling of cationic dispersed material is difficult relative to the anionic dispersion described in Examples 1-4. Upon addition of extra cationic dispersant, the slurry experiences a momentary pigment shock and immediately requires some dilution water during the wet milling process. The product characteristics before and after wet milling are provided in Table C.

The data in Table C indicate that increases in surface area and decreases in particle size are due to wet milling. The particle size data show that %<0.2 microns increases from 12.9% (original material) up to 95.0% depending on the intensity of the wet milling.

EXAMPLE 6

By following the procedure of Example 5, the cationic Kaojet kaolin clay slurry equivalent to 5 pounds dry material is wet milled at different process times (10, 20, 30, 40, 50 or 60 minutes), except that the total amount of dispersant required for wet milling is added in the beginning of the process. In other words, the feed material is mixed with an excess amount of cationic dispersant (over dispersion) prior to the wet milling process. The product characteristics before and after wet milling are provided in Table D.

The data in Table D indicate that increases in surface area and decreases in particle size are due to wet milling compared with the starting original material. The particle size data in Table D show that %<0.2 microns increases from 7.7 (original material) to 59.9 after 10 minutes of wet milling, 71.2 after 20 minutes of wet milling, 78.4 after 30 minutes of wet milling and 87.4-88.5 after 40-60 minutes of wet milling. The particle size data for the product produced at 40-60 minutes of process time are similar to the 75 minute products described in Example 5. The ease of the wet milling process for a cationic slurry is improved due to the addition of an excess amount of cationic dispersant to the feed (over dispersion), rather than the addition of an excess amount during the wet milling process as in Example 5.

This Example 6 demonstrates that the over dispersion of feed helps to maintain high product solids, reduces process time and increases throughput (the amount of material generated per hour). This Example 6 also demonstrates that the final product quality can be carefully controlled by process time, product solids and the point of dispersant addition.

TABLE C

| | KAOJET, Cationic Dispersion | | |
|---|---|---|---|
| | | Wet Milled | |
| | Original | Product 10 | Product 11 |
| Wet milling conditions | | | |
| Process time, min | — | 75 | 75 |
| [1]Clay loading, pounds | — | 5.0 | 2.5 |
| [2]Dispersant, % | 1.6 | 6.0 | 6.0 |
| Product Characteristics | | | |
| Slurry solids, % | 59.0 | 35.5 | 26.7 |
| Slurry pH | 4.8 | 4.9 | 4.8 |
| Brookfield viscosity, cP @20 rpm | 600 | 3150 | 1320 |
| BET surface area, $m^2/g$ | 41.5 | 65-71.2 | 102.3 |
| Particle size | | | |
| % < 5.0 µm | 76.2 | 98.9 | 99.1 |
| % < 2.0 µm | 45.1 | 98.0 | 98.2 |
| % < 1.0 µm | 30.8 | 98.8 | 98.4 |
| % < 0.5 µm | 23.3 | 97.3 | 98.3 |
| % < 0.25 µm | 15.5 | 92.3 | 97.1 |
| % < 0.2 µm | 12.9 | 88.5 | 95.0 |

[1,2]Dry basis,
[2]Poly-DADMAC

TABLE D

| | KAOJET, Cationic Dispersion | | | | | | |
|---|---|---|---|---|---|---|---|
| | | Wet Milled | | | | | |
| | Original | Product 12 | Product 13 | Product 14 | Product 15 | Product 16 | Product 17 |
| Wet milling conditions | | | | | | | |
| Process time, min | — | 10 | 20 | 30 | 40 | 50 | 60 |
| [1]Clay loading, pounds | — | 5.0 | 5.0 | 5.0 | 5.0 | 5.0 | 5.0 |
| [2]Dispersant, % | 1.6 | 4.0 | 4.0 | 4.7 | 4.7 | 6.0 | 6.0 |
| Product Characteristics | | | | | | | |
| Product solids, % | 59.0 | 46.9 | 44.0 | 40.0 | 38.3 | 37.0 | 37.0 |
| Product slurry pH | 4.8 | 4.9 | 4.9 | 4.9 | 4.9 | 4.9 | 4.8 |
| Brookfield viscosity, cP @20 rpm | 600 | 2290 | 2260 | 4000 | 4100 | 2700 | 3200 |

TABLE D-continued

| | KAOJET, Cationic Dispersion | | | | | |
|---|---|---|---|---|---|---|
| | | Wet Milled | | | | |
| | Original | Product 12 | Product 13 | Product 14 | Product 15 | Product 16 | Product 17 |
| BET surface area, m²/g | 41.5 | 51.2 | 57.3 | 60-63.0 | 58.5-68.6 | 58.4-68.2 | 63-67.7 |
| Particle size | | | | | | | |
| %<5.0 µm | 76.2 | 99.2 | 99.1 | 99.4 | 99.5 | 98.9 | 99.1 |
| %<2.0 µm | 45.1 | 97.6 | 98.7 | 98.2 | 98.7 | 98.4 | 97.9 |
| %<1.0 µm | 30.8 | 94.8 | 97.3 | 97.5 | 98.1 | 98.1 | 97.7 |
| %<0.5 µm | 23.3 | 84.3 | 90.6 | 94.9 | 96.7 | 97.3 | 96.2 |
| %<0.25 µm | 15.5 | 66.2 | 76.4 | 84.3 | 90.8 | 91.8 | 91.2 |
| %<0.2 µm | 12.9 | 59.9 | 71.2 | 78.4 | 87.4 | 88.8 | 87.8 |

[1,2] Dry basis,
[2] Poly-DAMAC

EXAMPLE 7

A cationic slurry of Kaofine 90 kaolin clay is used as the starting material. A cationic Kaofine 90 kaolin clay slurry is prepared using 1.5% (dry/dry clay basis) of Nalkat 2020 polymer. By following the procedure of Example 5, the cationic Kaofine 90 kaolin clay slurry equivalent to 5 pounds dry material is wet milled at 60 minutes of process time. As the wet milling continues, the clay particles are broken down into ultrafine particles, and the slurry becomes thick. An additional 2.5% dispersant (Nalkat 2020) is added to facilitate slurry flow. Water is used as a second option to facilitate slurry flow. The product characteristics before and after wet milling are provided in Table E.

The data in Table E indicate that surface area increases and particle size decreases with wet milling. The particle size data show that %<0.2 microns increases from 8.2 (original material) to 85.4 after wet milling.

EXAMPLE 8

A calcined kaolin marketed under the trademark Kaocal by Thiele Kaolin Company is used as the starting material. A cationic slurry of Kaocal kaolin clay is prepared using 1.0% (dry/dry clay basis) of Nalkat 2020 polymer. By following the procedure of Example 5, the cationic Kaocal kaolin clay slurry equivalent to 5 pounds dry material is wet milled at 60 minutes of process time. As the wet milling continues, the original low bulk density, high pore volume aggregates of the calcined clay are broken down into fine particles. The wet milling of Kaocal kaolin clay does not require any water or additional dispersant other than what is added during pigment dispersion. The wet milled product is improved in flow properties compared to the original material. The product characteristics before and after wet milling are provided in Table E.

The data in Table E indicate that increases in surface area and decreases in particle size are due to wet milling compared with the original starting material. The particle size data show that %<0.2 microns increases from 8.7 (original material) to 47.7 after wet milling.

TABLE E

| | KAOFINE 90, Cationic Dispersion | | KAOCAL, Cationic Dispersion | |
|---|---|---|---|---|
| | Unground Original | Wet Milled Product 18 | Unground Original | Wet Milled Product 19 |
| Wet milling conditions | | | | |
| Process time, min | — | 60 | — | 60 |
| [1]Clay loading, pounds | — | 5.0 | — | 5.0 |
| [2]Dispersant, % | 1.5 | 4.0 | 1.0 | 1.0 |
| Product Characteristics | | | | |
| Product solids, % | 55.0 | 40.3 | 50.0 | 51.0 |
| Product slurry pH | 4.7 | 4.2 | 3.5 | 5.0 |
| Brookfield viscosity, cP @20 rpm | 1250 | 2350 | 125 | 65 |
| BET surface area, m²/g | 20.0 | 36.7 | 18.8 | 27.7 |
| Particle size | | | | |
| % < 5.0 µm | 99.8 | 99.2 | 89.2 | 100.0 |
| % < 2.0 µm | 99.0 | 98.0 | 75.5 | 98.7 |
| % < 1.0 µm | 96.0 | 98.0 | 64.8 | 95.5 |
| % < 0.5 µm | 78.3 | 97.0 | 44.8 | 86.9 |
| % < 0.25 µm | 18.3 | 89.5 | 13.8 | 59.2 |
| % < 0.2 µm | 8.2 | 85.4 | 8.3 | 47.7 |

[1,2]Dry basis,
[2]Poly-DADMAC

EXAMPLE 9

The wet milled samples of anionic Kaofine 90 kaolin clay produced at both 60 and 120 minutes (i.e., the products described in Example 1) are evaluated for ink jet coating and printability. The coating formulations, coated sheet properties and ink jet printability data are provided in Table F.

The coating formulations are prepared at around 45% solids and a pH value of 7.0 by adding 3 parts per hundred of ethylene vinyl acetate copolymer latex binder to the pigment slurry. The coating formulation of original unground product is prepared at 49.5% solids and a pH value of 7.0 by adding 5 parts per hundred of an ethylene vinyl acetate binder to the pigment slurry. A cationic coating is required for ink jet application to anchor the ink jet colorants on the surface of the coated sheet for high water fastness property. The coating can be made cationic by either using a cationically dispersed pigment or adding a cationic dye-fixative such as Poly-DAD- MAC to the coating prepared from an anionically dispersed pigment. However, the wet milled ultrafine anionic slurry products of this invention are not compatible with the cationic dye fixatives (such as Poly-DADMAC) and can result in severe flocculation of the coating color.

The coating formulations are applied to a substrate having a basis weight ~72 g/m² using a laboratory drawdown machine on single side at about 10-11 g/m² coat weight. The coated sheets are dried using a heat gun and conditioned for 24 hours in a constant temperature and humidity room according to standard TAPPI conditions before evaluation. The coated sheets are then soft-nip calendered (1 pass/side, 163 PLI pressure at 300° F. temperature) using a laboratory calender. The conditioned coated sheets are measured for sheet gloss (75 degree gloss) and roughness (Parker Print-Surf roughness) both before and after calendering. The calendered sheets are printed with an in-house print target using Canon BJC 8200 and HP 990cxi printers. The prints are visually observed for ink dry time (time to absorb ink) and image sharpness (visual wicking and bleeding). The print color (cyan, magenta, yellow and black) density is measured using a X-Rite 418 color reflection densitometer.

The coated sheet data in Table F indicate that the ink jet color (cyan, magenta, yellow and black) density and dry time are improved for wet milled Kaofine 90 kaolin clay without substantially degrading the sheet gloss, compared with the original unground material. The higher color density indicates that the finer particle size and high surface area are helpful for better hold-out of colorants present in ink jet inks. The original Kaofine 90 kaolin clay results in an unacceptable image quality; ink in the color print is agglomerated, and a poor image is formed. The after calendered sheet gloss for wet milled products of Kaofine 90 kaolin clay is in the range of 60-63.0 as compared to 65.0 for the original material. The sheet gloss of wet milled products tend to be lower due to less platy nature of the pigment particles as compared to the original material.

This Example 9 demonstrates that the process of this invention can be used to produce products suitable to obtain high coated sheet gloss and ink jet color density. This Example 9 also demonstrates that the products of this invention would require less binder than the original unground material.

TABLE F

| | KAOFINE 90 | | |
| --- | --- | --- | --- |
| | Original | Wet Milled (Anionic) | |
| | Unground | Product '1' | Product '2' |
| Coating Formulation | Parts | Parts | Parts |
| Clay, Parts | 100 | 100 | 100 |
| Ethylene Vinyl Acetate | 5 | 3 | 3 |
| Poly-DADMAC | 0 | 0 | 0 |
| Coating pH | 7.0 | 7.0 | 7.0 |
| Coating Solids, % | 49.5 | 45.1 | 44.6 |
| Brookfield Viscosity, cP @20 rpm | 90 | 850 | 1350 |
| Coated sheet Properties | | | |
| Coat weight, gram/m² | 10.3 | 10.0 | 10.2 |
| Gloss | | | |
| Uncalendered | 30.0 | 39.0 | 37.0 |
| ¹Calendered | 65.4 | 63.0 | 60.0 |
| PPS Roughness | | | |
| Uncalendered | 3.06 | 3.76 | 3.77 |
| ¹Calendered | 0.95 | 1.23 | 1.49 |

TABLE F-continued

| | KAOFINE 90 | | |
| --- | --- | --- | --- |
| | Original | Wet Milled (Anionic) | |
| | Unground | Product '1' | Product '2' |
| Ink Jet Printability | | | |
| Color Density | Canon BJC 8200 Printer | | |
| Cyan | 1.28 | 1.36 | 1.44 |
| Magenta | 1.03 | 1.10 | 1.18 |
| Yellow | 0.84 | 0.89 | 0.96 |
| Black | 1.02 | 1.07 | 1.17 |
| Image Sharpness | 5 | 4 | 4 |
| ²Ink drying | 5 | 4 | 4 |
| Color Density | HP Deskjet 990cxi Printer | | |
| Cyan | 1.14 | 1.24 | 1.36 |
| Magenta | 0.94 | 1.07 | 1.20 |
| Yellow | 0.72 | 0.82 | 0.89 |
| Black | 2.36 | 1.90 | 1.90 |
| Image Sharpness | 3 | 2 | 2 |
| ²Ink drying | 3 | 2 | 2 |

¹Soft Nip calendered @ 1 pass/side, 163 PLI at 260° F., PLI = pound per liner inch
²1 = best and 5 = worst

EXAMPLE 10

By following the procedure of Example 9, the wet milled samples of Kaojet kaolin clay produced at 60 and 120 minutes process time (products described in Example 3) are evaluated for ink jet coating and printability. The coating formulations, coated sheet properties and ink jet printability data are provided in Table G.

The coating formulations are prepared at around 45% solids and a pH value of 7.0 by adding 3 parts per hundred of ethylene vinyl acetate copolymer latex binder to the pigment slurry. The coating formulation of original material is prepared at 50.2% solids and a pH value of 7.0 by adding 5 parts per hundred of ethylene vinyl acetate binder and 4 parts per hundred poly-DADMAC to the pigment slurry. The coating formulations are applied to a substrate having a basis weight ~72 g/m², using a laboratory drawdown machine on single side at about 10-11 g/m² coat weight.

The coated sheet data in Table G indicate that the roughness, sheet gloss, ink jet color (cyan, magenta, yellow and black) density and dry time are improved for wet milled Kaojet kaolin clay compared with the original material. The higher color density indicates that the finer particle size and high surface area are helpful for better hold-out of colorants present in ink jet inks. The color density of these wet milled samples is higher than the color density obtained with the wet milled samples of Kaofine 90 kaolin clay (described in Example 9). The sheet gloss increases from 6-8 (original) up to 61 for wet milled Kaojet kaolin clay. The sheet gloss of wet milled samples is improved due to decrease in particle size as compared to the much coarser and aggregated particles of original feed. The sheet gloss of 120 minutes product is slightly poorer than 60 minutes product due to cracking of coating film with much finer 120 minutes product. The cracking of coating films is a common phenomenon for nano scale pigment particles such as alumina hydrate used in high gloss ink jet coatings.

TABLE G

| | KAOJET | | |
|---|---|---|---|
| | | Wet Milled (Anionic) | |
| | Original | Product '5' | Product '6' |
| Coating Formulation | Parts | Parts | Parts |
| Pigment, Parts | 100 | 100 | 100 |
| Ethylene Vinyl Acetate | 5 | 3 | 3 |
| Poly-DADMAC | 4 | 0 | 0 |
| Coating pH | 5.0 | 6.8 | 6.9 |
| Coating Solids, % | 50.2 | 45.0 | 44.6 |
| Brookfield Viscosity, cP @20 rpm | 320 | 420 | 550 |
| Coated sheet Properties | | | |
| Coat weight, gram/m$^2$ | 10.9 | 10.4 | 10.4 |
| Gloss | | | |
| Uncalendered | 2-3 | 34.0 | 36.0 |
| [1]Calendered | 6-8 | 61.0 | 58.4 |
| PPS Roughness | | | |
| Uncalendered | 4-5 | 3.62 | 3.31 |
| [1]Calendered | 2.7 | 1.07 | 1.34 |
| Ink Jet Printability | | | |
| Color Density | Canon BJC 8200 Printer | | |
| Cyan | [3]1.38 | 1.56 | 1.64 |
| Magenta | 1.28 | 1.34 | 1.38 |
| Yellow | 0.96 | 1.05 | 1.07 |
| Black | 1.28 | 1.30 | 1.32 |
| [2]Image Sharpness | 3 | 3 | 3 |
| [2]Ink drying | 3 | 2 | 2 |
| Color Density | HP Deskjet 990cxi Printer | | |
| Cyan | 1.28 | 1.37 | 1.49 |
| Magenta | 1.22 | 1.27 | 1.38 |
| Yellow | 0.90 | 0.89 | 0.93 |
| Black | 1.58 | 2.15 | 1.86 |
| [2]Image Sharpness | 2 | 2 | 2 |
| [2]Ink drying | 2 | 1 | 1 |

[1]Soft Nip calendared @ 1 pass/side, 163 PLI at 260° F., PLI = pound per liner inch
[2]1 = best and 5 = worst

EXAMPLE 11

The wet milled sample of cationic Kaojet kaolin clay produced at 75 minutes process time as described in Example 5 is evaluated for ink jet coating and printability by following the procedure of Example 9. The coating formulations, coated sheet properties and ink jet printability data are provided in Table H. The coating formulations are prepared by adding 3 parts per hundred of ethylene vinyl acetate copolymer latex binder to the pigment slurry. The coating formulation of original material is prepared at 50.2% solids and a pH value of 5.0 by adding 5 parts per hundred of ethylene vinyl acetate binder and 4 parts per hundred of poly-DADMAC (total including dispersant amount) to the pigment slurry. The coating formulation of cationic wet milled products are prepared without additional poly-DADMAC. The coatings are applied to a substrate having a basis weight ~72 g/m$^2$ using a laboratory drawdown machine at about 10-11 g/m$^2$ coat weight.

The coated sheet data in Table H indicate that the roughness decreases and sheet gloss increases for wet milled Kaojet kaolin clay compared to the original material. The sheet gloss increases from 6-8 for original Kaojet kaolin clay up to 56 for wet milled samples. The sheet gloss of wet milled samples is improved due to the decrease in particle size as compared to the much coarser and aggregated particles of original Kaojet kaolin clay feed. The wet milled products are improved in color (cyan, magenta, yellow and black) density and dry time compared with original Kaojet kaolin clay feed. The higher color density indicates that the finer particle size and high surface area are helpful for better hold-out of colorants present in ink jet inks. The cationic polymer added in the wet milling acts as a dye-fixing agent and provides improved image sharpness.

This Example 11 demonstrates that the wet milled samples of cationic Kaojet kaolin clay can be coated with a lower amount of binder than the original material. In addition, this Example 11 demonstrates that the process of the present invention can be used to produce products that are cationic in nature and suitable for high gloss ink jet application.

EXAMPLE 12

By following the procedure of Example 11, the wet milled products of cationic Kaojet kaolin clay produced at different process times (produced at 10, 30, 40, and 50 minutes; products described in Example 6) are evaluated for ink jet coating and printability. The coating formulations, coated sheet properties and ink jet printability data are provided in Table I. Coating formulations are prepared at 37.4-46.2% solids depending on the pigment solids by adding 3-5 parts per hundred of ethylene vinyl acetate binder to the pigment slurry. The coating formulation of original material is prepared at 50.2% solids and a pH value of 5.0 by adding 5 parts per hundred of ethylene acetate binder and 4 parts per hundred of poly-DADMAC to the pigment slurry. The coatings are applied to a substrate having a basis weight ~72 g/m$^2$ using a laboratory drawdown machine at about 10-11 g/m$^2$ coat weight.

The coated sheet data provided in Table I indicate that the roughness decreases and sheet gloss increases for wet milled Kaojet kaolin clay compared to original Kaojet kaolin clay feed. The sheet gloss increases from 6-8 for original Kaojet kaolin clay feed up to 57.5-60 for wet milled Kaojet kaolin clay depending on the wet milling process time. The sheet gloss of wet milled samples is improved due to decrease in particle size as compared to the much coarser and aggregated particles of original Kaojet kaolin clay feed. The wet milled products are improved in color (cyan, magenta, yellow and black) density and dry time compared with the original Kaojet kaolin clay feed. The color density is about the same for wet milled samples produced at 30-50 minutes process time, while the wet milled sample produced at 10 minutes process time is lower in color density but improved over the original Kaojet kaolin clay feed. In addition, the color density of wet milled products produced at 30-50 minutes process time is about the same as the 75 minutes products discussed in Example 11. The cationic polymer added in the wet milling acts as a dye-fixing agent and provides improved image sharpness.

This Example 12 demonstrates that throughput from the wet milling unit can be increased by lowering the process time and still produce products that are cationic in nature and suitable for high gloss ink jet application.

TABLE H

| | KAOJET, Cationic Dispersion | | |
|---|---|---|---|
| | | Wet Milled | |
| | Original | Product 10 | Product 11 |
| Coating Formulation | Parts | Parts | Parts |
| Clay, Parts | 100 | 100 | 100 |
| Ethylene Vinyl Acetate | 5 | 3 | 3 |
| Poly-DADMAC | 4 | 0 | 0 |

TABLE H-continued

| | KAOJET, Cationic Dispersion | | |
|---|---|---|---|
| | | Wet Milled | |
| | Original | Product 10 | Product 11 |
| Coating pH | 5.0 | 4.8 | 5.3 |
| Coating Solids, % | 50.2 | 34.5 | 26.3 |
| Brookfield Viscosity, cP @20 rpm | 320 | 1268 | 1410 |
| Coated sheet Properties | | | |
| Coat weight, gram/m² | 10.9 | 10.7 | 9.8 |
| Gloss | | | |
| Uncalendered | 2-3 | 30.3 | 28.0 |
| ¹Calendered | 6-8 | 54.5 | 56.2 |
| PPS Roughness | | | |
| Uncalendered | 4-5 | 3.12 | 3.8 |
| ¹Calendered | 2.7 | 1.76 | 2.1 |
| Ink Jet Printability | | | |
| Color Density | Canon BJC 8200 Printer | | |
| Cyan | 1.38 | 1.52-1.58 | 1.53 |
| Magenta | 1.28 | 1.37-1.43 | 1.45 |
| Yellow | 0.96 | 1.05-1.08 | 1.07 |
| Black | 1.28 | 1.37-1.43 | 1.44 |
| ²Image Sharpness | 3 | 2 | 2 |
| ²Ink drying | 3 | 2 | 2 |
| Color Density | HP DeskJet 990cxi Printer | | |
| Cyan | 1.28 | 1.55-1.54 | 1.54 |
| Magenta | 1.22 | 1.35-1.40 | 1.50 |
| Yellow | 0.90 | 1.00-1.03 | 1.08 |
| Black | 1.58 | 1.92-1.95 | 1.90 |
| ²Image Sharpness | 2 | 1 | 1 |
| ²Ink drying | 2 | 1 | 1 |

¹Soft Nip calendered @ 1 pass/side, 163 PLI at 260° F., PLI = pound per liner inch
²1 = best and 5 = worst

TABLE I

| | KAOJET, Cationic Dispersion | | | | |
|---|---|---|---|---|---|
| | | Wet Milled | | | |
| | Original | Product '12' | Product '14' | Product '15' | Product '16' |
| Coating Formulation | Parts | Parts | Parts | Parts | Parts |
| Clay, Parts | 100 | 100 | 100 | 100 | 100 |
| Ehtylene Vinyl Acetate | 5 | 3 | 3 | 5 | 5 |
| Poly-DADMAC | 4 | 0 | 0 | 0 | 0 |
| Coating pH | 5.0 | 5.0 | 5.1 | 4.8 | 4.8 |
| Coating Solids, % | 50.2 | 46.2 | 38.2 | 38.9 | 37.4 |
| Brookfield Viscosity, cP at 20 rpm | 320 | 1350 | 1600 | 1630 | 2550 |
| Coated Sheet Properties | | | | | |
| Coat weight, gram/m² | 10.9 | 10.2 | 10.4 | 11.2 | 11.0 |
| Gloss | | | | | |
| Uncalendered | 2-3 | 26.8 | 29.8 | 31.8 | 31.2 |
| ¹Calendered | 6-8 | 60.0 | 59.8 | 58.5 | 57.5 |
| PPS Roughness | | | | | |
| Uncalendered | 4-5 | 2.96 | 3.34 | 2.92 | 2.96 |
| ¹Calendered | 2.7 | 1.22 | 1.46 | 1.57 | 1.58 |
| Ink Jet Printability | | | | | |
| Color Density | Canon BJC 8200 Printer | | | | |
| Cyan | 1.38 | 1.57 | 1.59 | 1.60 | 1.57 |
| Magenta | 1.28 | 1.29 | 1.33 | 1.40 | 1.38 |
| Yellow | 0.96 | 1.02 | 1.04 | 1.06 | 1.04 |
| Black | 1.28 | 1.28 | 1.36 | 1.40 | 1.38 |
| ²Image Sharpness | 3 | 4 | 3 | 2 | 2 |
| ²Ink drying | 3 | 4 | 3 | 2 | 2 |
| Color Density | HP DeskJet 990cxi Printer | | | | |
| Cyan | 1.28 | 1.45 | 1.48 | 1.55 | 1.53 |
| Magenta | 1.22 | 1.29 | 1.32 | 1.35 | 1.35 |
| Yellow | 0.90 | 0.94 | 0.95 | 0.99 | 0.99 |
| Black | 1.58 | 1.97 | 1.94 | 1.93 | 1.92 |
| ²Image Sharpness | 2 | 3 | 2 | 1 | 1 |
| ²Ink drying | 2 | 2 | 1.5 | 1 | 1 |

¹Soft Nip calendered @ 1 pass/side, 163 PLI at 260° F., PLI = pound per liner inch
²1 = best and 5 = worst

EXAMPLE 13

The wet milled product of cationic Kaofine 90 kaolin clay produced in Example 7 is evaluated for ink jet coating and printability by following the procedure of Example 11. The coating formulation, coated sheet properties and printability data for unground and wet milled samples are presented in Table J. Coating formulations are prepared by adding 5 parts per hundred of ethylene vinyl acetate binder to the wet milled pigment slurry. The coating formulation of original unground Kaofine 90 kaolin clay feed is prepared by adding 5 parts per hundred ethylene vinyl acetate binder and 4 parts per hundred of poly-DADMAC. The coatings are applied to a substrate having a basis weight ~72 g/m² using a laboratory drawdown machine on one side at about 10-11 g/m² coat weight.

The coated sheet data provided in Table J indicate that the wet milled product of Kaofine 90 kaolin clay is improved in color (cyan, magenta, yellow and black) density and dry time without substantially degrading the calendered sheet gloss and surface roughness compared with original unground material. The more rounded particles of wet milled product result in a sheet gloss of 60 compared with a sheet gloss of 66 for the original material with platy particles. The original Kaofine 90 kaolin clay material results in high black ink color density but has a very poor color (cyan, magenta and yellow) density and an unacceptable image quality. Ink in the color print is agglomerated, and a poor image is formed.

This Example 13 demonstrates that Kaofine 90 kaolin clay can be used to produce wet milled products that are cationic in nature and suitable for high gloss ink jet application.

EXAMPLE 14

The wet milled cationic Kaocal kaolin clay product produced in Example 8 is evaluated for ink jet coating and printability by following the similar procedure described in Example 11, except that a much stronger binder is required for the original feed material. The coating formulation, coated sheet properties and printability data for original unground and wet milled samples are presented in Table J. A coating formulation of wet milled product is prepared at 51.2% solids by adding 5 parts per hundred of ethylene vinyl acetate binder to the pigment slurry. The coating formulation of original Kaocal kaolin clay feed is prepared at 35% solids by adding 7.5 parts per hundred of high molecular weight polyvinyl alcohol binder and 4 parts poly-DADMAC to the pigment slurry. The coating solids of original Kaocal kaolin clay is lower due to much lower solids of the polyvinyl alcohol binder. The coatings are applied to a substrate having a basis weight ~72 g/m² using a laboratory drawdown machine on one side at about 10-11 g/m² coat weight. The binder demand for original Kaocal kaolin clay is very high compared to the wet milled Kaocal kaolin clay and causes severe dusting; therefore, a stronger polyvinyl alcohol binder is used.

The wet milled product of cationic Kaocal kaolin clay slurry shows a significant improvement in coated sheet roughness, sheet gloss, ink jet color (cyan, magenta, yellow and black) density and image formation compared with the original unground material (Table J). Although ink dry time is acceptable, the unground material results in very poor ink jet printability in terms of color density and image formation. The wet milling process breaks the original low bulk density, high pore volume and high light scattering aggregates of the calcined clay. The resulting fine particles improve coated sheet gloss and ink jet printability in terms of color density and image formation without substantially changing the dry time (time to dry the ink).

This Example 14 demonstrates that the calcined clay can also be used to produce wet milled products that are cationic in nature and suitable for high gloss ink jet application.

TABLE J

| | KAOFINE 90, Cationic Dispersed | | KAOCAL, Cationic Dispersed | |
|---|---|---|---|---|
| | Original Unground | Wet Milled Product 18 | Original Unground | Wet Milled Product 19 |
| Coating Formulation | | | | |
| Clay, Parts | 100 | 100 | 100 | 100 |
| Ethylene Vinyl Acetate | 5 | 5 | 0 | 5 |
| Polyvinyl Alcohol | — | — | 7.5 | — |
| Poly-DADMAC | 4.0 | — | 4 | — |
| Coating pH | 4.0 | 4.6 | 4.0 | 4.9 |
| Coating Solids, % | 50.0 | 40.5 | 33.5 | 51.2 |
| Brookfield Viscosity, cP at 20 rpm | 1600 | 765 | 450 | 230 |
| Coated Sheet Properties | | | | |
| Coat weight, gram/m² | 10.9 | 9.9 | 11.0 | 9.9 |
| Gloss, | | | | |
| Uncalendered | 35.4 | 26.7 | 6.0 | 32.0 |
| ¹Calendered | 66.0 | 60.5 | 32.5 | 63.6 |
| PPS Roughness | | | | |
| Uncalendered | 2.2 | 3.8 | 3.9 | 2.84 |
| ¹Calendered | 0.86 | 1.05 | 1.36 | 0.94 |
| Ink Jet Printability | | | | |
| Color Density | Canon BJC 8200 Printer | | | |
| Cyan | 1.38 | 1.52 | 1.21 | 1.43 |
| Magenta | 1.13 | 1.26 | 0.98 | 1.12 |
| Yellow | 0.98 | 1.10 | 0.82 | 0.84 |
| Black | 1.10 | 1.21 | 0.97 | 1.08 |
| ²Image Sharpness | 5 | 2 | 5 | 2 |
| ²Ink drying | 5 | 2 | 1 | 2 |
| Color Density | HP Deskjet 990cxi Printer | | | |
| Cyan | 1.34 | 1.44 | 1.10 | 1.28 |
| Magenta | 1.02 | 1.23 | 0.90 | 1.06 |
| Yellow | 0.78 | 0.95 | 0.70 | 0.75 |
| Black | 1.94 | 1.97 | 1.82 | 2.00 |
| ²Image Sharpness | 5 | 2 | 5 | 2 |
| ²Ink drying | 4 | 2 | 1 | 1.5 |

¹Soft Nip calendered @ 1 pass/side, 163 PLI at 260° F., PLI = pound per liner inch
²1 = best and 5 = worst

EXAMPLE 15

This Example 15 demonstrates the self binding (binderless) characteristics of the wet milled kaolin. By following the procedure of Example 11, the wet milled product of cationic Kaojet kaolin clay (produced at 75 minutes, Product 10 of Example 5) is evaluated for ink jet coating and printability without binder. A coating formulation is also prepared by adding 3 parts per hundred ethylene vinyl acetate binder for comparison. The coated sheets are prepared by directly applying the pigment slurry to a substrate having a basis weight ~72 g/m² using a laboratory drawdown machine on one side at about 10-11 g/m² coat weight. The coated sheets without binder are evaluated for ink jet printability by following the procedure of Example 11. The coating formulations, coated sheet properties and ink jet printability data are provided in Table K.

The wet milled Kaojet kaolin clay pigment coating without a binder adheres strongly to the base paper. The coated sheet strength is evaluated by dry finger rub and tape pull test methods. The coated sheets without binder do not cause any significant dusting, and the strength is sufficient to withstand high calender pressure and to feed through an ink jet printer without any significant problem. Also, the binderless coating resulted in improved ink absorption (Canon printer) and similar sheet gloss and optical density as compared to the sheets prepared using 3 parts of binder.

TABLE K

| | KAOJET, Cationic Dispersion, Product 10 | |
|---|---|---|
| | Without Binder | Using Binder |
| Coating Formulation | | |
| Clay, Parts | 100 | 100 |
| Ethylene Vinyl Acetate | — | 3 |
| Polyvinyl Alcohol | — | — |
| Poly-DADMAC | — | — |
| Coating pH | 5.0 | 4.8 |
| Coating Solids, % | 34.0 | 34.4 |
| Brookfield Viscosity, cP at 20 rpm | 2900 | 2650 |
| Coated Sheet Properties | | |
| Coat weight, gram/m² | 10.6 | 10.7 |
| Gloss, | | |
| Uncalendered | 29.0 | 30.3 |
| ¹Calendered | 53.0 | 54.5 |
| PPS Roughness | | |
| Uncalendered | 4.42 | 3.12 |
| ¹Calendered | 1.72 | 1.76 |
| Ink jet Printability | | |
| Cyan | 1.55 | 1.52 |
| Magenta | 1.35 | 1.34 |
| Yellow | 1.00 | 1.01 |
| Black | 1.35 | 1.35 |
| ²Image Sharpness | 1.5 | 2 |
| ²Ink drying | 1.5 | 2 |
| Cyan | 1.47 | 1.49 |
| Magenta | 1.35 | 1.30 |
| Yellow | 0.98 | 0.98 |
| Black | 1.80 | 1.92 |
| ²Image Sharpness | 1 | 1 |
| ²Ink drying | 1 | 1 |

¹Soft Nip calendered @ 1 pass/side, 163 PLI at 260° F., PLI = pound per liner inch
²1 = best and 5 = worst This invention has been described in detail with particular reference to certain embodiments, but variations and modifications can be made without departing from the spirit and scope of the invention.

What is claimed is:

1. A process for the manufacture of a mineral pigment by treating an unground mineral composition, wherein the process comprises the sequential steps of:

A. obtaining a beneficiated, unground mineral composition;
B. dry grinding the mineral composition under conditions of high intensity sufficient to aggregate the particles of the mineral composition;
   whereby the surface area of the aggregated particles is increased over the surface area of the particles of the unground mineral composition; and
C. wet milling the aggregated dry ground mineral composition under conditions of high intensity to produce a mineral pigment,
   whereby the particles of the mineral pigment are substantially increased in surface area and substantially decreased in particle size as compared to the dry ground mineral composition prior to wet milling.

2. A process as defined by claim 1 wherein the beneficiated unground mineral composition is selected from the group consisting of hydrous kaolin clay, calcined kaolin clay, natural calcium carbonate, precipitated calcium carbonate, calcium sulfate, aluminum hydroxide, aluminum oxide, iron hydroxide, iron oxide, bentonite, zeolite, titanium dioxide, talc and mixtures thereof.

3. A process as defined by claim 1 wherein the beneficiated unground mineral composition is hydrous kaolin clay.

4. A process as defined by claim 1 wherein the beneficiated unground mineral composition is calcined kaolin clay.

5. A process as defined by claim 1 wherein the beneficiated unground mineral composition is natural calcium carbonate.

* * * * *